US012639155B2

(12) United States Patent
Sethia et al.

(10) Patent No.: US 12,639,155 B2
(45) Date of Patent: May 26, 2026

(54) SYSTEM AND METHOD FOR ARTIFICIAL INTELLIGENCE-BASED REMEDIATION OF COMPUTING INFRASTRUCTURE ISSUES USING FEDERATED AND REINFORCEMENT LEARNING

(71) Applicant: BANK OF AMERICA CORPORATION, Charlotte, NC (US)

(72) Inventors: Maneesh Kumar Sethia, Hyderabad (IN); Gowri Sundar Suriyanarayanan, Chennai (IN); Manju Priya v, Chennai (IN); Sivashalini Sivajothi, Chennai (IN); Shameera Roohin Mohammed Nasrullah, Chengalpatlu (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 8 days.

(21) Appl. No.: 18/772,970

(22) Filed: Jul. 15, 2024

(65) Prior Publication Data

US 2026/0017138 A1 Jan. 15, 2026

(51) Int. Cl.
*G06F 11/07* (2006.01)
*G06N 3/098* (2023.01)

(52) U.S. Cl.
CPC ...... *G06F 11/0793* (2013.01); *G06F 11/0709* (2013.01); *G06N 3/098* (2023.01)

(58) Field of Classification Search
CPC ............. G06F 11/0706; G06F 11/0709; G06F 11/079; G06F 11/0793; G06N 3/098
See application file for complete search history.

(56) References Cited

U.S. PATENT DOCUMENTS

| | | | |
|---|---|---|---|
| 8,055,944 B2 * | 11/2011 | Guven | ................ G06F 11/0748 |
| | | | 714/48 |
| 9,092,802 B1 | 7/2015 | Akella | |
| 10,673,882 B2 | 6/2020 | Davis, III | |
| 11,121,872 B2 | 9/2021 | Digiambattista | |
| 11,416,329 B2 * | 8/2022 | Frazier | ................ G06F 11/0709 |
| 11,526,408 B2 | 12/2022 | Karr | |

(Continued)

FOREIGN PATENT DOCUMENTS

WO     WO-2022093239 A1 *   5/2022   ......... G06F 11/3006

*Primary Examiner* — Joseph R Kudirka
(74) *Attorney, Agent, or Firm* — Moore & Van Allen PLLC; Nicholas C. Russell

(57) ABSTRACT

A system is provided for artificial intelligence-based remediation of computing infrastructure issues using federated and reinforcement learning. In particular, the system may use a federated learning strategy to monitor technical issues within the computing environment and identify patterns associated with the issues. Based on the patterns, the system may generate a rule template for remediating the issue. The system may further use a reinforcement learning strategy to orchestrate and execute the rules for remediating the issue on the affected computing devices or resources. The system may also use a fallback mechanism to ensure data and service availability while issues are being remediated. Local AI models may be installed on endpoint devices to support self-remediation, which in turn increases the computational efficiency of the remediation processes. In this way, the system provides an intelligent, efficient, and secure way to remediate issues within the computing environment.

17 Claims, 5 Drawing Sheets

(56) References Cited

U.S. PATENT DOCUMENTS

| 12,052,145 | B2 | 7/2024 | Vandikas | |
| 2018/0367561 | A1 | 12/2018 | Givental | |
| 2019/0171438 | A1 | 6/2019 | Franchitti | |
| 2019/0332921 | A1 | 10/2019 | Rodriguez | |
| 2020/0027019 | A1 | 1/2020 | Yang | |
| 2020/0065682 | A1 | 2/2020 | Paulina | |
| 2021/0073677 | A1 | 3/2021 | Peterson | |
| 2021/0168175 | A1 | 6/2021 | Crabtree | |
| 2022/0036194 | A1 | 2/2022 | Sundaresan | |
| 2022/0078081 | A1 | 3/2022 | Mahdi | |
| 2022/0129556 | A1 | 4/2022 | Chen | |
| 2022/0201042 | A1 | 6/2022 | Crabtree | |
| 2022/0210200 | A1 | 6/2022 | Crabtree | |
| 2022/0344883 | A1 | 10/2022 | Misener | |
| 2023/0068386 | A1 | 3/2023 | Akdeniz | |
| 2023/0350744 | A1* | 11/2023 | Zhu | G06F 11/0787 |
| 2024/0007414 | A1 | 1/2024 | Jain | |

* cited by examiner

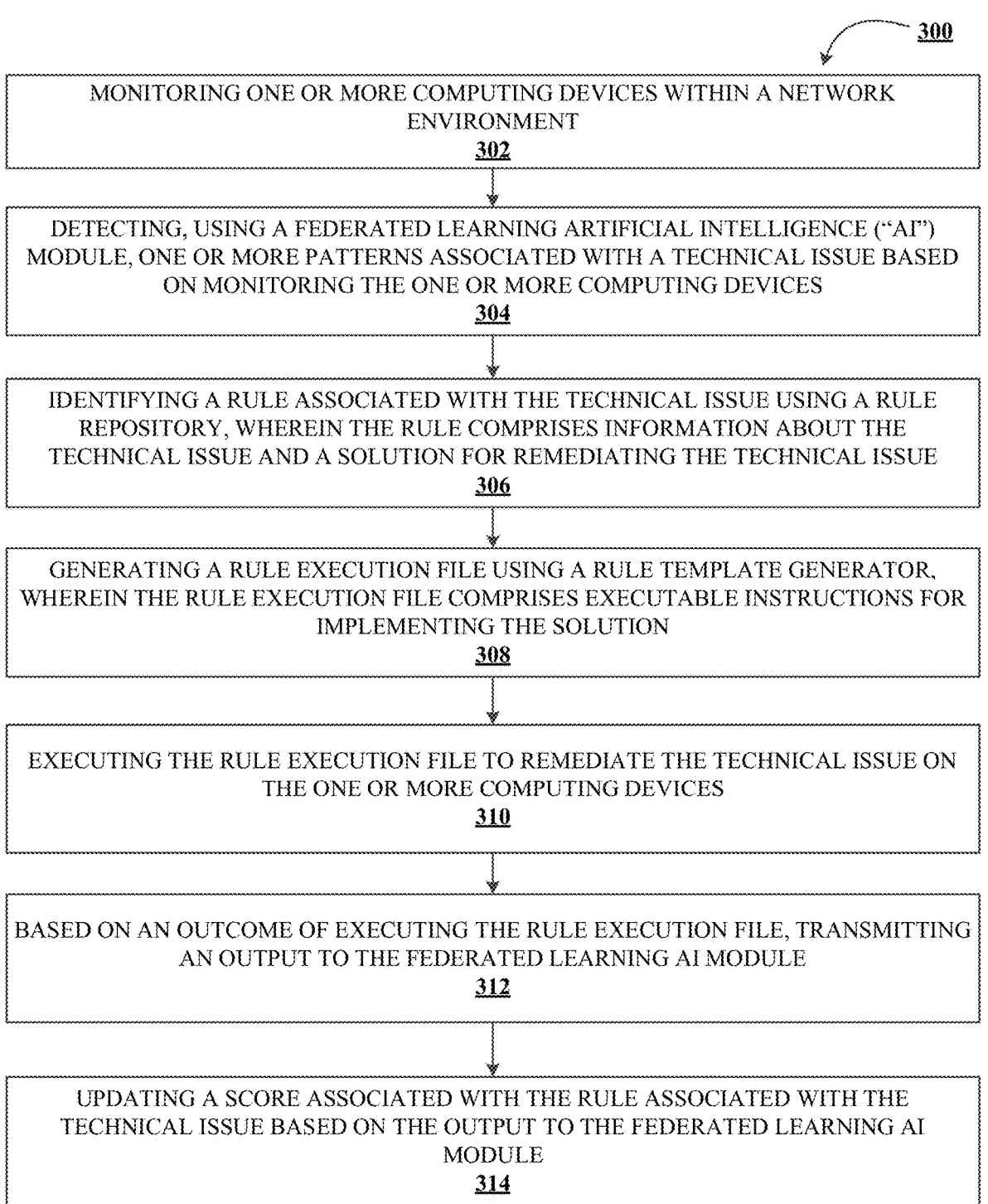

300

MONITORING ONE OR MORE COMPUTING DEVICES WITHIN A NETWORK
ENVIRONMENT
302

DETECTING, USING A FEDERATED LEARNING ARTIFICIAL INTELLIGENCE ("AI")
MODULE, ONE OR MORE PATTERNS ASSOCIATED WITH A TECHNICAL ISSUE BASED
ON MONITORING THE ONE OR MORE COMPUTING DEVICES
304

IDENTIFYING A RULE ASSOCIATED WITH THE TECHNICAL ISSUE USING A RULE
REPOSITORY, WHEREIN THE RULE COMPRISES INFORMATION ABOUT THE
TECHNICAL ISSUE AND A SOLUTION FOR REMEDIATING THE TECHNICAL ISSUE
306

GENERATING A RULE EXECUTION FILE USING A RULE TEMPLATE GENERATOR,
WHEREIN THE RULE EXECUTION FILE COMPRISES EXECUTABLE INSTRUCTIONS FOR
IMPLEMENTING THE SOLUTION
308

EXECUTING THE RULE EXECUTION FILE TO REMEDIATE THE TECHNICAL ISSUE ON
THE ONE OR MORE COMPUTING DEVICES
310

BASED ON AN OUTCOME OF EXECUTING THE RULE EXECUTION FILE, TRANSMITTING
AN OUTPUT TO THE FEDERATED LEARNING AI MODULE
312

UPDATING A SCORE ASSOCIATED WITH THE RULE ASSOCIATED WITH THE
TECHNICAL ISSUE BASED ON THE OUTPUT TO THE FEDERATED LEARNING AI
MODULE
314

FIG. 3

SYSTEM AND METHOD FOR ARTIFICIAL INTELLIGENCE-BASED REMEDIATION OF COMPUTING INFRASTRUCTURE ISSUES USING FEDERATED AND REINFORCEMENT LEARNING

TECHNOLOGICAL FIELD

Example embodiments of the present disclosure relate to a system and method for artificial intelligence-based remediation of computing infrastructure issues using federated and reinforcement learning.

BACKGROUND

There is a need for an intelligent, efficient way to remediate computing infrastructure related issues within a networked environment.

BRIEF SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

A system is provided for artificial intelligence-based remediation of computing infrastructure issues using federated and reinforcement learning. In particular, the system may use a federated learning strategy to monitor technical issues within the computing environment and identify patterns associated with the issues. Based on the patterns, the system may generate a rule template for remediating the issue. The system may further use a reinforcement learning strategy to orchestrate and execute the rules for remediating the issue on the affected computing devices or resources. The system may also use a fallback mechanism to ensure data and service availability while issues are being remediated. Local AI models may be installed on endpoint devices to support self-remediation, which in turn increases the computational efficiency of the remediation processes. In this way, the system provides an intelligent, efficient, and secure way to remediate issues within the computing environment.

Accordingly, embodiments of the present disclosure provide a system for artificial intelligence-based remediation of computing infrastructure issues using federated and reinforcement learning, the system comprising: a processing device; a non-transitory storage device containing instructions when executed by the processing device, causes the processing device to perform the steps of: monitoring one or more computing devices within a network environment; detecting, using a federated learning artificial intelligence ("AI") module, one or more patterns associated with a technical issue based on monitoring the one or more computing devices, wherein the technical issue is associated with a target computing device of the one or more computing devices; identifying a rule associated with the technical issue using a rule repository, wherein the rule comprises information about the technical issue and a solution for remediating the technical issue; generating a rule execution file using a rule template generator, wherein the rule execution file comprises executable instructions for implementing the solution; executing the rule execution file to remediate the technical issue on the target computing device; based on an outcome of executing the rule execution file, transmitting an output to the federated learning AI module; and updating an effectiveness score associated with the rule associated with the technical issue based on the output to the federated learning AI module.

In some embodiments, executing the rule execution file further comprises: obtaining a service ID associated with the target computing device; creating a session on the target computing device based on the service ID; and executing the rule execution file within the session on the target computing device.

In some embodiments, the outcome of executing the rule execution file is a successful remediation of the technical issue, wherein the output comprises feedback that the technical issue has been remediated, wherein updating the effectiveness score comprises incrementing the effectiveness score.

In some embodiments, the outcome of executing the rule execution file is a failure to remediate the technical issue, wherein the output comprises feedback that the technical issue has not been remediated, wherein updating the effectiveness score comprises decreasing the effectiveness score.

In some embodiments, the output further comprises a trigger signal to initiate a fallback mechanism, wherein initiating the fallback mechanism comprises providing access to resources within the target computing device through a cache hosted on the target computing device.

In some embodiments, the technical issue comprises an infrastructure issue, wherein the infrastructure issue comprises at least one of a resource unavailability on the target computing device, artifacts in memory of the target computing device, or read timeout of the target computing device.

In some embodiments, monitoring one or more computing devices within a network environment comprises reading one or more alerts related to the technical issue within logs stored on the target computing device.

Embodiments of the present disclosure also provide a computer program product for artificial intelligence-based remediation of computing infrastructure issues using federated and reinforcement learning, the computer program product comprising a non-transitory computer-readable medium comprising code causing an apparatus to perform the steps of: monitoring one or more computing devices within a network environment; detecting, using a federated learning artificial intelligence ("AI") module, one or more patterns associated with a technical issue based on monitoring the one or more computing devices, wherein the technical issue is associated with a target computing device of the one or more computing devices; identifying a rule associated with the technical issue using a rule repository, wherein the rule comprises information about the technical issue and a solution for remediating the technical issue; generating a rule execution file using a rule template generator, wherein the rule execution file comprises executable instructions for implementing the solution; executing the rule execution file to remediate the technical issue on the target computing device; based on an outcome of executing the rule execution file, transmitting an output to the federated learning AI module; and updating an effectiveness score associated with the rule associated with the technical issue based on the output to the federated learning AI module.

In some embodiments, executing the rule execution file further comprises: obtaining a service ID associated with the target computing device; creating a session on the target computing device based on the service ID; and executing the rule execution file within the session on the target computing device.

In some embodiments, the outcome of executing the rule execution file is a successful remediation of the technical issue, wherein the output comprises feedback that the technical issue has been remediated, wherein updating the effectiveness score comprises incrementing the effectiveness score.

In some embodiments, the outcome of executing the rule execution file is a failure to remediate the technical issue, wherein the output comprises feedback that the technical issue has not been remediated, wherein updating the effectiveness score comprises decreasing the effectiveness score.

In some embodiments, the output further comprises a trigger signal to initiate a fallback mechanism, wherein initiating the fallback mechanism comprises providing access to resources within the target computing device through a cache hosted on the target computing device.

In some embodiments, the technical issue comprises an infrastructure issue, wherein the infrastructure issue comprises at least one of a resource unavailability on the target computing device, artifacts in memory of the target computing device, or read timeout of the target computing device.

Embodiments of the present disclosure also provide a computer-implemented method for artificial intelligence-based remediation of computing infrastructure issues using federated and reinforcement learning, the computer-implemented method comprising: monitoring one or more computing devices within a network environment; detecting, using a federated learning artificial intelligence ("AI") module, one or more patterns associated with a technical issue based on monitoring the one or more computing devices, wherein the technical issue is associated with a target computing device of the one or more computing devices; identifying a rule associated with the technical issue using a rule repository, wherein the rule comprises information about the technical issue and a solution for remediating the technical issue; generating a rule execution file using a rule template generator, wherein the rule execution file comprises executable instructions for implementing the solution; executing the rule execution file to remediate the technical issue on the target computing device; based on an outcome of executing the rule execution file, transmitting an output to the federated learning AI module; and updating an effectiveness score associated with the rule associated with the technical issue based on the output to the federated learning AI module.

In some embodiments, executing the rule execution file further comprises: obtaining a service ID associated with the target computing device; creating a session on the target computing device based on the service ID; and executing the rule execution file within the session on the target computing device.

In some embodiments, the outcome of executing the rule execution file is a successful remediation of the technical issue, wherein the output comprises feedback that the technical issue has been remediated, wherein updating the effectiveness score comprises incrementing the effectiveness score.

In some embodiments, the outcome of executing the rule execution file is a failure to remediate the technical issue, wherein the output comprises feedback that the technical issue has not been remediated, wherein updating the effectiveness score comprises decreasing the effectiveness score.

In some embodiments, the output further comprises a trigger signal to initiate a fallback mechanism, wherein initiating the fallback mechanism comprises providing access to resources within the target computing device through a cache hosted on the target computing device.

In some embodiments, the technical issue comprises an infrastructure issue, wherein the infrastructure issue comprises at least one of a resource unavailability on the target computing device, artifacts in memory of the target computing device, or read timeout of the target computing device.

In some embodiments, monitoring one or more computing devices within a network environment comprises reading one or more alerts related to the technical issue within logs stored on the target computing device.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
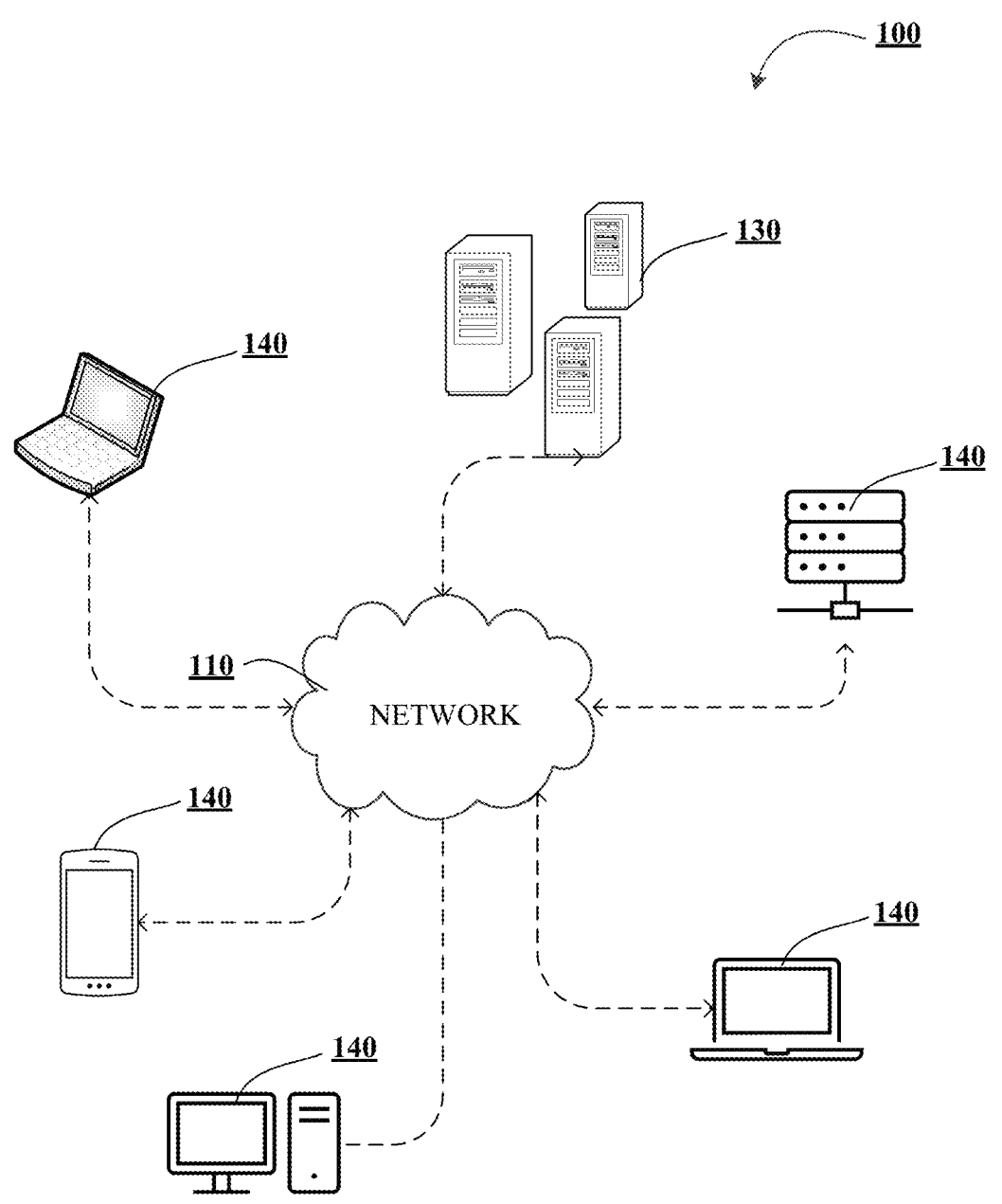
Figure 1B:
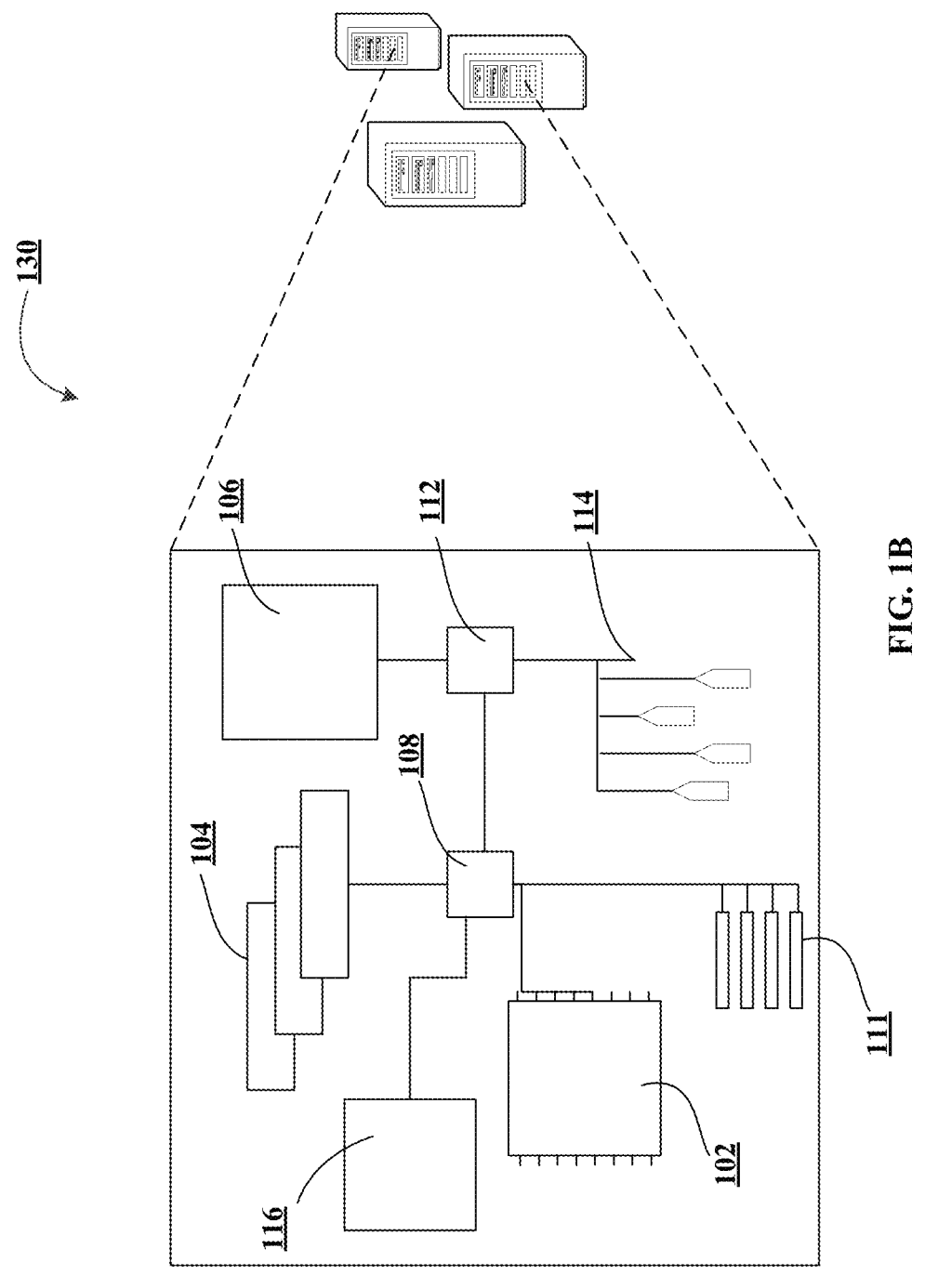
Figure 1C:
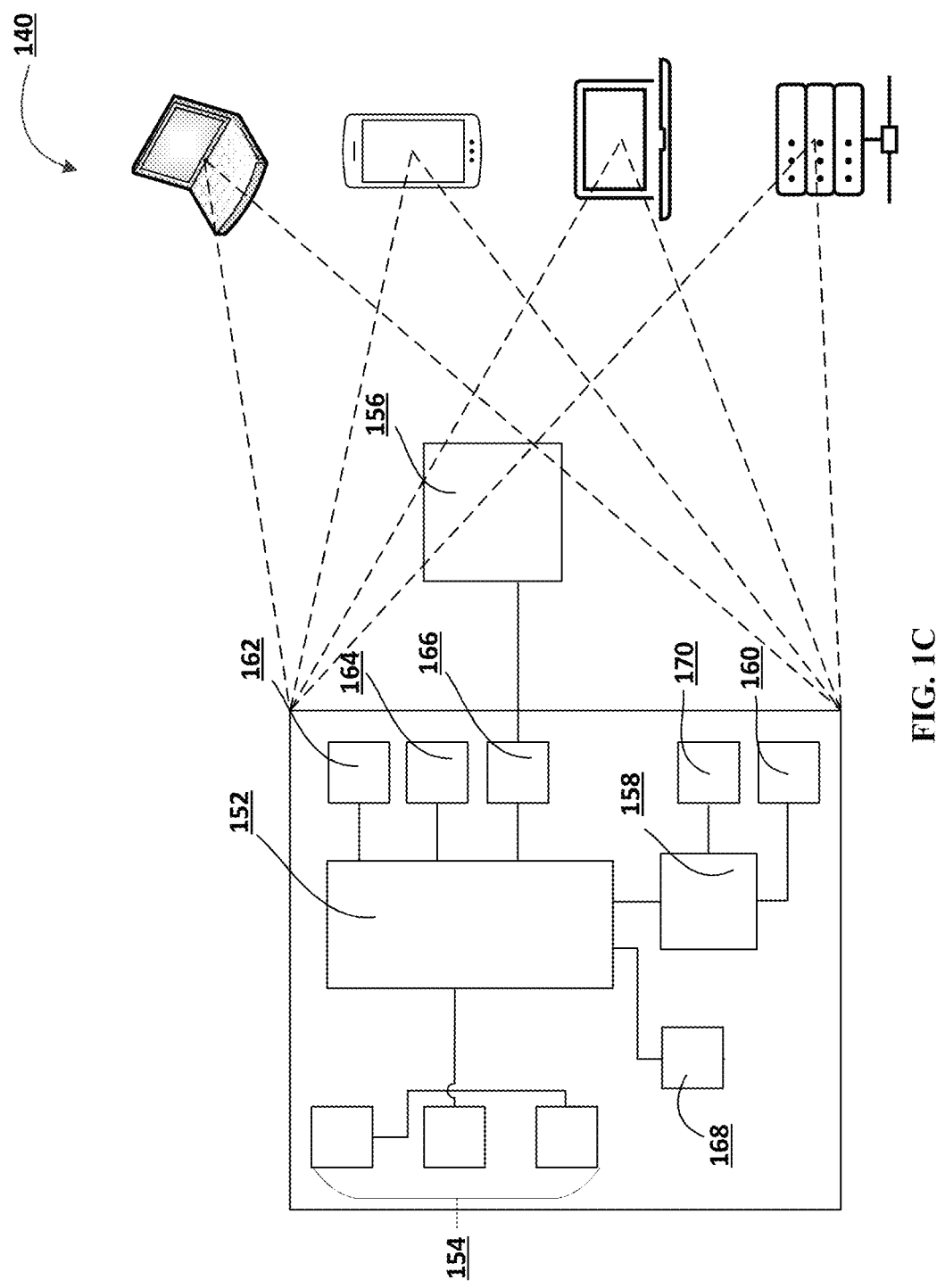
Figure 2:
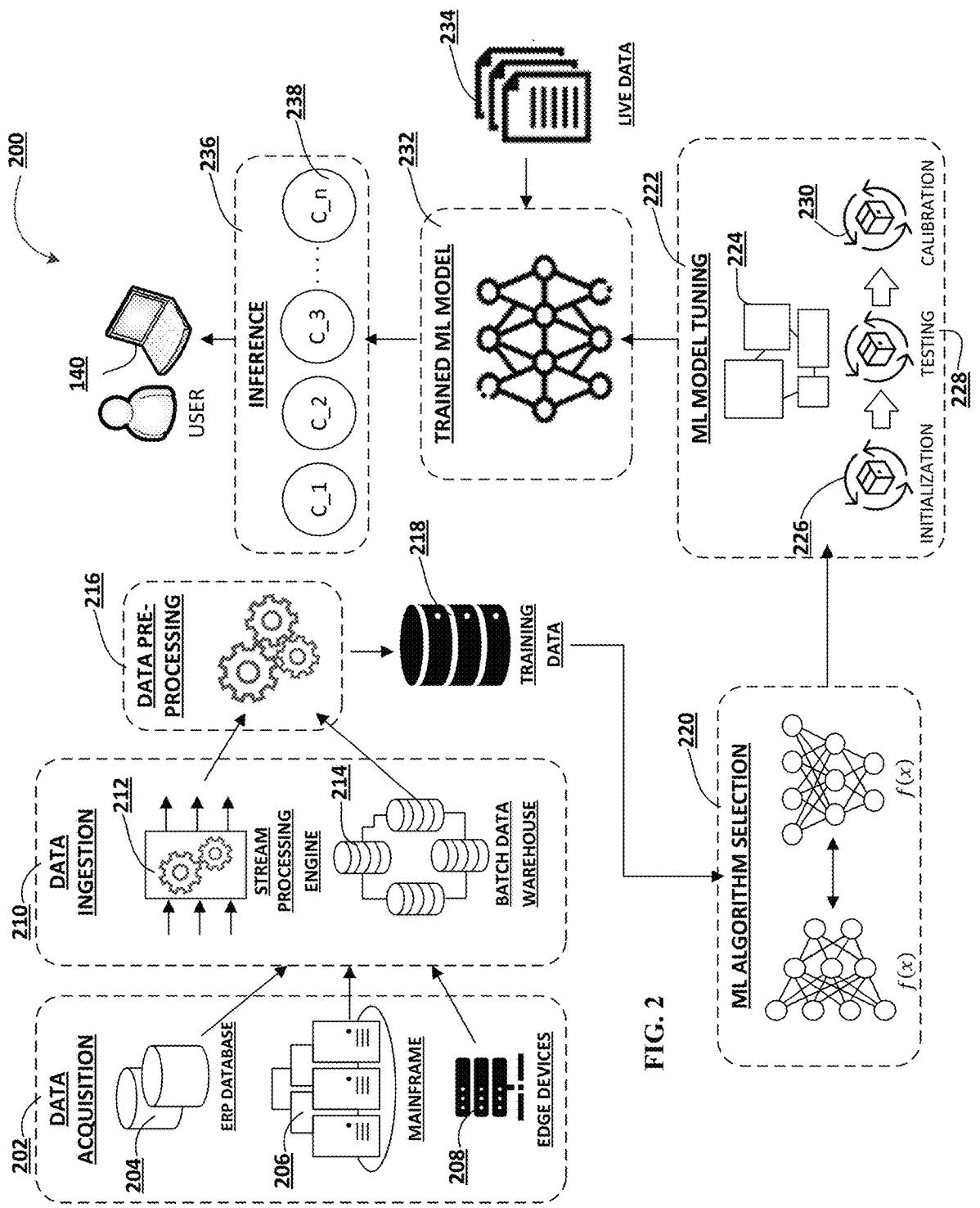

FIGS. 1A-1C illustrates technical components of an exemplary distributed computing system for artificial intelligence-based remediation of computing infrastructure issues using federated and reinforcement learning, in accordance with an embodiment of the disclosure;

FIG. 2 illustrates an exemplary machine learning subsystem architecture, in accordance with an embodiment of the invention; and FIG. 3 illustrates a method for artificial intelligence-based remediation of computing infrastructure issues using federated and reinforcement learning, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, unique characteristic information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, "resource" may refer to a tangible or intangible object that may be used, consumed, maintained, acquired, exchanged, and/or the like by a system, entity, or user to accomplish certain objectives. Accordingly, in some embodiments, the resources may include computing resources such as processing power, memory space, network bandwidth, bus speeds, storage space, electricity, and/or the like. In other embodiments, the resources may include objects such as electronic data files or values, authentication keys (e.g., cryptographic keys), document files, funds, digital currencies, and/or the like.

Various types of technical issues may arise during the operation of computing devices and applications within an entity's network environment. For instance, issues may occur based on failures within the infrastructure layer, such as resource unavailability, timeout, delays or latency, and/or the like. The issues may be caused by numerous different factors, such as inadequate memory space, coding errors, processing or network overload, and/or the like. Further, such issues may have a compounding effect in the event that the component or device experiencing the issue is part of a dependency chain within the network environment (e.g., a server becoming unavailable may affect multiple different applications that may depend on the server as part of their workflows). Accordingly, there is a need for an expedient, efficient way to remediate such technical issues in a timely manner.

To address the above concerns among others, the system described herein provides a way to detect, mitigate, and remediate technical issues within a computing environment by using artificial intelligence modules based on federated and reinforcement learning strategies as part of a selfhealing orchestration architecture that may span across the entire enterprise environment. In particular, the system may use one or more artificial intelligence ("AI") based modules as part of a federated learning strategy to detect issues within the network environment and identify a specific solution to the detected issues. The system may be configured to detect a number of technical issues, such as deadlock, read timeout, resource unavailability, memory leaks, artifacts remaining in memory after task completion, access latency or lack of responsiveness, and/or the like. To detect such issues, the system may monitor the various devices and/or applications within the network environment by aggregating status data from each of the devices and/or applications. In some embodiments, the system may use a data preprocessing module to perform preprocessing of the aggregated data into a format that may be better processed by the other modules. Upon preprocessing the aggregated data, the system may identify one or more patterns associated with and/or indicative of a technical issue from the status data (e.g., using an alert monitoring module configured to detect issues from alerts generated within the network environment).

Based on the identified patterns, the system may attempt to retrieve a solution for the issue associated with the patterns from a rule repository. The rule repository may comprise one or more entries (or "rules") for technical issues, where the entry may contain information regarding the patterns associated with each technical issue. Each entry may further comprise a solution identifier, which may uniquely identify a particular solution to the issue found within the entry. The solution identifier may point to a solution within a solution engine, which provides the solution associated with the solution identifier. In some embodiments, each entry may comprise a rating or effectiveness score which may signify the trustworthiness or effectiveness of a particular rule and/or solution. The rating score may be adjusted by one or more artificial intelligence and/or machine learning processes, as will be described in further detail.

Once the appropriate rule has been identified, the rule may be processed by a dynamic rule template generator that may be configured to generate executable instructions for implementing the solution into the affected computing devices and/or applications. In this regard, the template generator may generate a rule-based executable file that may comprise the executable instructions for implementing the chosen solution to the detected issues.

The executable file may be passed to a reinforcement learning ("RL") strategy AI module, which may comprise a reinforcement learning orchestrator and a reinforcement learning rule executor. The RL orchestrator may perform the tasks necessary to implement the solution into a particular target computing device or application. In this regard, the RL orchestrator may comprise a list of service ID's and login credentials (e.g., a username and password) needed to log into a particular computing device (e.g., the computing device experiencing the issue) and create a session to execute the executable file generated by the rule template generator. Once the session has been created by the RL orchestrator, the RL rule executor may execute the executable file through an AI-based agent that may be trained to execute the executable file to implement the chosen solution on the target computing device.

In some embodiments, one or more target computing devices within the network environment may host a local AI module that may be configured to store rule patterns and solutions with respect to the applications, processes, operating system, and/or the like that may be installed on the target computing device. The local AI module may detect that the solution selected by the system has remediated the issue within the target computing device. Subsequently, the local AI module may store the information associated with the solution (e.g., the rules and/or executable file) such that if the issue is encountered again within the target computing device, the local AI module may automatically execute the executable file to remediate the issue without the need to call the RL strategy AI module, which in turn improves the computing efficiency of the system as a whole.

The system may then determine whether the implemented solution has remediated the issue. In one scenario, the system may determine that the implemented solution has successfully remediated the issue. For instance, the system may continue to monitor the target computing device and detect, based on monitoring the target computing device, that the alerts regarding the issue have stopped after the rule-based executable file has been executed. In such a scenario, the system may increment the rating score associated with the rule and/or solution. The solution may then be stored within the local AI modules of the affected target computing devices.

On the other hand, in the event that the implemented solution has failed to successfully remediate the issue, the system may trigger a fallback mechanism to ensure the uptime of the affected applications and/or services hosted by the target computing device. In an exemplary embodiment, an infrastructure issue within a server may cause a database to become temporarily unavailable. In such an embodiment, the fallback mechanism may comprise a data cache that may at least partially mirror the state of the unavailable database, where the data cache may be updated based on changes to the data state using reducers. The data within the data cache may then be served to the requesting computing devices (e.g., external client devices) until the infrastructure issue within the target computing device is remediated and the services of the target computing device are thereafter restored. In this way, the system minimizes the extent to which ongoing infrastructure issues may affect applications and/or services hosted within the network environment.

Turning now to the figures, FIGS. 1A-1C illustrate technical components of an exemplary distributed computing environment 100 for the system for artificial intelligence-based remediation of computing infrastructure issues using federated and reinforcement learning. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. For instance, the functions of the system 130 and the endpoint devices 140 may be performed on the same device (e.g., the endpoint device 140). Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it. In some embodiments, the system 130 may provide an application programming interface ("API") layer for communicating with the end-point device(s) 140.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as servers, networked storage drives, personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102 (which may also be referred to herein as a "processing device"), memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a selfcontained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 . . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . . C_n 238) live data 234 based on how similar they are to one another to solve exploratory challenges where little is known about the data, provide a description or label (e.g., C_1, C_2 . . . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a method 300 for artificial intelligence-based remediation of computing infrastructure issues using federated and reinforcement learning. As shown in block 302, the method includes monitoring one or more computing devices within a network environment. In this regard, the system may continuously monitor the system logs within each of the one or more computing devices. The logs may contain, for instance, information relating to the running process and/or applications within each of the one or more computing devices, where the information may include event related information, alerts or warnings, computing resource usage information, and/or the like.

Next, as shown in block 304, the method includes detecting, using a federated learning artificial intelligence ("AI") module, one or more patterns associated with a technical issue based on monitoring the one or more computing devices, wherein the technical issue is associated with a target computing device of the one or more computing devices. The technical issues detected by the federated learning AI module may include various types of technical issues. In some embodiments, the issue may be an infrastructure issue such as locked or frozen applications, read timeout, resource unavailability, artifacts remaining in memory, memory leak, system latency or unresponsiveness, and/or the like. Accordingly, the one or more patterns detected by the AI module may include detectable indicators of the infrastructure issues, such as alerts or warnings that may be stored in the logs of each of the target computing devices.

Next, as shown in block 306, the method includes identifying a rule associated with the technical issue using a rule repository, wherein the rule comprises information about the technical issue and a solution for remediating the technical issue. Each solution associated with the rule and/or technical issue may be associated with a solution identifier within the rule repository. In some embodiments, each rule within the rule repository may further be associated with an effectiveness score which may indicate the level of effectiveness or trustworthiness of a particular rule and/or solution with respect to the remediation of the technical issue.

Next, as shown in block 308, the method includes generating a rule execution file using a rule template generator, wherein the rule execution file comprises executable instructions for implementing the solution. The rule template generator may be a dynamic AI-based module that may generate the executable instructions based on the solution contained within the rule associated with the technical issue.

In this way, the system may be able to dynamically generate implementations for remediating technical issues as they occur.

Next, as shown in block 310, the method includes executing the rule execution file to remediate the technical issue on the target computing device. In some embodiments, executing the rule execution file may comprise logging into the affected computing device using a reinforcement learning orchestrator, where logging in may comprise obtaining a service ID associated with the affected computing device, authenticating a session based on the service ID, and creating the session within the computing device for executing the rule execution file. In other embodiments, executing the rule execution file may comprise storing the rule and the rule execution file within a local AI module within the computing device, and subsequently executing the execution file using the local AI module.

Next, as shown in block 312, the method includes, based on an outcome of executing the rule execution file, transmitting an output to the federated learning AI module. The output to the federated learning AI module may include feedback regarding the effectiveness of the selected rule or solution (e.g., an effectiveness score). Accordingly, if the outcome is a successful remediation of the technical issue, the output to the AI module may include feedback indicating that the technical issue has been remediated by implementation of the solution. On the other hand, if the outcome is a failure to remediate the technical issue, the output may include feedback indicating that the technical issue has not been remediated by implementation of the solution. In such embodiments, the output may further comprise a trigger signal to initiate a fallback mechanism, where the fallback mechanism may provide access to resources within the one or more affected computing devices through a cache that reflects the state of the applications within the one or more computing devices. Upon detecting that the technical issue has been remediated, the fallback mechanism may then revoke access to the resource within the cache.

Next, as shown in block 314, the method includes updating an effectiveness score associated with the rule associated with the technical issue based on the output to the federated learning AI module. If the feedback from the affected computing device indicates that the solution was effective in remediating the issue, the effectiveness score associated with the rule may be incremented. On the other hand, if the feedback from the affected computing device indicates that the solution was not effective in remediating the issue, the effectiveness score associated with the rule may be reduced. In turn, the effectiveness scores associated with the rules and/or solutions may affect the way in which the federated learning AI module selects solutions for a particular technical issue (e.g., higher effectiveness scores may cause the AI module to be more likely to select the particular solution, whereas lower effectiveness scores may cause the AI module to be less likely to select the solution). In this way, the system provides an efficient and dynamic way to remediate technical issues within the network environment.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for artificial intelligence-based remediation of computing infrastructure issues using federated and reinforcement learning, the system comprising:
a processing device; and
a non-transitory storage device containing instructions which, when executed by the processing device, cause the processing device to perform:
monitoring one or more computing devices within a network environment;
detecting, using a federated learning artificial intelligence ("AI") module, one or more patterns associated with a technical issue based on monitoring the one or more computing devices, wherein the technical issue is associated with a target computing device of the one or more computing devices;
identifying a rule associated with the technical issue using a rule repository, wherein the rule comprises information about the technical issue and a solution for remediating the technical issue;
generating a rule execution file using a rule template generator, wherein the rule execution file comprises executable instructions for implementing the solution;
executing the rule execution file to remediate the technical issue on the target computing device, wherein executing the rule execution file further comprises:
obtaining a service identifier (ID) associated with the target computing device;
creating a session on the target computing device based on the service ID; and
executing the rule execution file within the session on the target computing device;
based on an outcome of executing the rule execution file, transmitting an output to the federated learning AI module; and
updating an effectiveness score associated with the rule associated with the technical issue based on the output to the federated learning AI module.

2. The system of claim 1, wherein the outcome of executing the rule execution file is a successful remediation of the technical issue, wherein the output comprises feedback that the technical issue has been remediated, wherein updating the effectiveness score comprises incrementing the effectiveness score.

3. The system of claim 1, wherein the outcome of executing the rule execution file is a failure to remediate the technical issue, wherein the output comprises feedback that the technical issue has not been remediated, wherein updating the effectiveness score comprises decreasing the effectiveness score.

4. The system of claim 3, wherein the output further comprises a trigger signal to initiate a fallback mechanism, wherein initiating the fallback mechanism comprises providing access to resources within the target computing device through a cache hosted on the target computing device.

5. The system of claim 1, wherein the technical issue comprises an infrastructure issue, wherein the infrastructure issue comprises at least one of a resource unavailability on the target computing device, artifacts in memory of the target computing device, or read timeout of the target computing device.

6. The system of claim 1, wherein monitoring one or more computing devices within a network environment comprises reading one or more alerts related to the technical issue within logs stored on the target computing device.

7. A computer program product for artificial intelligence-based remediation of computing infrastructure issues using federated and reinforcement learning, the computer program product comprising a non-transitory computer-readable medium comprising code causing an apparatus to perform:
    monitoring one or more computing devices within a network environment;
    detecting, using a federated learning artificial intelligence ("AI") module, one or more patterns associated with a technical issue based on monitoring the one or more computing devices, wherein the technical issue is associated with a target computing device of the one or more computing devices;
    identifying a rule associated with the technical issue using a rule repository, wherein the rule comprises information about the technical issue and a solution for remediating the technical issue;
    generating a rule execution file using a rule template generator, wherein the rule execution file comprises executable instructions for implementing the solution;
    executing the rule execution file to remediate the technical issue on the target computing device, wherein executing the rule execution file further comprises:
        obtaining a service identifier (ID) associated with the target computing device;
        creating a session on the target computing device based on the service ID; and
        executing the rule execution file within the session on the target computing device;
    based on an outcome of executing the rule execution file, transmitting an output to the federated learning AI module; and
    updating an effectiveness score associated with the rule associated with the technical issue based on the output to the federated learning AI module.

8. The computer program product of claim 7, wherein the outcome of executing the rule execution file is a successful remediation of the technical issue, wherein the output comprises feedback that the technical issue has been remediated, wherein updating the effectiveness score comprises incrementing the effectiveness score.

9. The computer program product of claim 7, wherein the outcome of executing the rule execution file is a failure to remediate the technical issue, wherein the output comprises feedback that the technical issue has not been remediated, wherein updating the effectiveness score comprises decreasing the effectiveness score.

10. The computer program product of claim 9, wherein the output further comprises a trigger signal to initiate a fallback mechanism, wherein initiating the fallback mechanism comprises providing access to resources within the target computing device through a cache hosted on the target computing device.

11. The computer program product of claim 7, wherein the technical issue comprises an infrastructure issue, wherein the infrastructure issue comprises at least one of a resource unavailability on the target computing device, artifacts in memory of the target computing device, or read timeout of the target computing device.

12. A computer-implemented method for artificial intelligence-based remediation of computing infrastructure issues using federated and reinforcement learning, the computer-implemented method comprising:
    monitoring one or more computing devices within a network environment;
    detecting, using a federated learning artificial intelligence ("AI") module, one or more patterns associated with a technical issue based on monitoring the one or more computing devices, wherein the technical issue is associated with a target computing device of the one or more computing devices;
    identifying a rule associated with the technical issue using a rule repository, wherein the rule comprises information about the technical issue and a solution for remediating the technical issue;
    generating a rule execution file using a rule template generator, wherein the rule execution file comprises executable instructions for implementing the solution;
    executing the rule execution file to remediate the technical issue on the target computing device, wherein executing the rule execution file further comprises:
        obtaining a service identifier (ID) associated with the target computing device;
        creating a session on the target computing device based on the service ID; and
        executing the rule execution file within the session on the target computing device;
    based on an outcome of executing the rule execution file, transmitting an output to the federated learning AI module; and
    updating an effectiveness score associated with the rule associated with the technical issue based on the output to the federated learning AI module.

13. The computer-implemented method of claim 12, wherein the outcome of executing the rule execution file is a successful remediation of the technical issue, wherein the output comprises feedback that the technical issue has been remediated, wherein updating the effectiveness score comprises incrementing the effectiveness score.

14. The computer-implemented method of claim 12, wherein the outcome of executing the rule execution file is a failure to remediate the technical issue, wherein the output comprises feedback that the technical issue has not been remediated, wherein updating the effectiveness score comprises decreasing the effectiveness score.

15. The computer-implemented method of claim 14, wherein the output further comprises a trigger signal to initiate a fallback mechanism, wherein initiating the fallback mechanism comprises providing access to resources within the target computing device through a cache hosted on the target computing device.

16. The computer-implemented method of claim 12, wherein the technical issue comprises an infrastructure issue, wherein the infrastructure issue comprises at least one of a resource unavailability on the target computing device, artifacts in memory of the target computing device, or read timeout of the target computing device.

17. The computer-implemented method of claim 12, wherein monitoring one or more computing devices within a network environment comprises reading one or more alerts related to the technical issue within logs stored on the target computing device.

\*  \*  \*  \*  \*